R. S. JENNINGS,

Assignor to J. LEVERING and G. O. MANNING, trustees.

PACKING CASE.

No. 10,126. Reissued May 30, 1882.

WITNESSES

A. G. Dyhmun

S. S. Kane,

By his Attorney,

INVENTOR

Ralph S. Jennings.

E. M. Johnson

N. PETERS, Photo-Lithographer, Washington, D. C.

UNITED STATES PATENT OFFICE.

RALPH S. JENNINGS, OF BALTIMORE, ASSIGNOR TO JOSHUA LEVERING, OF BALTIMORE, AND GEORGE O. MANNING, OF BALTIMORE COUNTY, MARYLAND, TRUSTEES.

PACKING-CASE.

SPECIFICATION forming part of Reissued Letters Patent No. 10,126, dated May 30, 1882.

Original No. 237,873, dated February 15, 1881. Application for reissue filed March 11, 1882.

*To all whom it may concern:*

Be it known that I, RALPH S. JENNINGS, a citizen of the United States of America, residing at Baltimore, in the county of Baltimore and State of Maryland, have invented certain new and useful Improvements in Packing-Cases, of which the following is a specification, reference being had therein to the accompanying drawings, in which—

Figure 1:
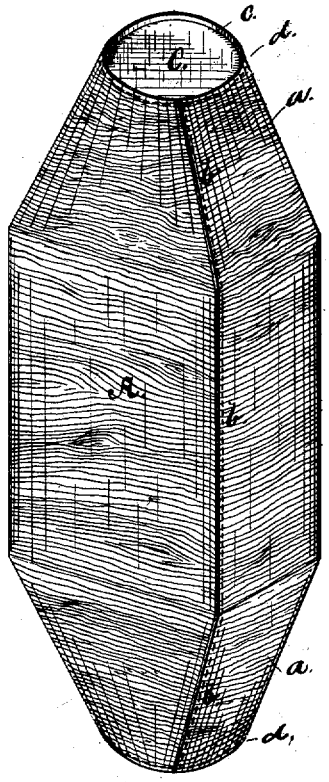
Figure 2:
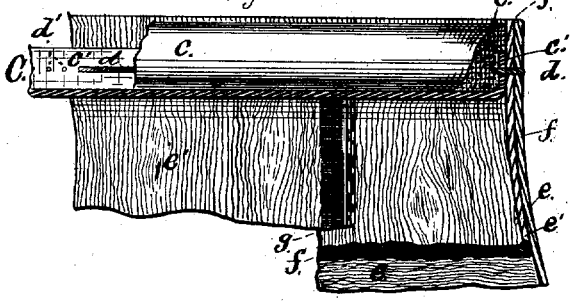

Figure 1 is a perspective view of the packing-case, and Fig. 2 is a sectional view on an enlarged scale, showing the head-joints.

My invention has for its object to furnish a cheap, strong, and water and acid proof packing-case, mainly designed for containing fertilizers, but obviously, by reason of the properties named, adapted for other uses.

The corrosive action of so-called "superphosphates" or "acid phosphates" upon the material of the "gunny-bags" in which they are shipped, and the fact that the bags are permeable to water and to the odor of the fertilizer, have rendered a substitute for the bagging which shall be cheap, strong, and impermeable to fluids a great desideratum. I fully attain it by constructing a packing-case as follows:

Referring to the accompanying drawings, A is a packing-case, constructed of two or more layers, *e e'*, of veneer, having the grain crossed and cemented together by a suitable waterproof material, *f*, asphalt cement answering the purpose well. The ends *a* of the packing-case are tapered slightly, the center being either round, oval, or polygonal in cross-section. The edges *b* of the material or veneer are united by stitching with thread, the seams being waterproofed by a coating of the cement.

The head or heads C are made by striking up a sheet of metal—by preference, tin-plate—so as to leave a flange, *c'*, all around, which flange is perforated, a line of holes being formed in it, through which it is stitched, as at *d*, to the ends of the body of the case. The joint is then coated by a layer, *c*, of cement, which serves to waterproof the joint and to strengthen the chine of the packing-case. The seams, being corrodible, are coated on the inside with non-corrodible cement, to prevent the material (inclosed by the packing-case, as fertilizers, &c.) from rotting the threads of the stitches.

The metallic head may bear the trade-mark and address of the manufacturer, the analysis of the fertilizer, or other matter, which is conveniently struck up upon it at the same time that the heads are punched from the sheets. The heads may be round, oval, or polygonal, round being preferred, as the packing-case may then be conveniently rolled on its chine.

The packing-case made as above described is practically air and water tight. It is light and very strong, and eminently fitted for holding any article which it is desired to protect from leakage or access of water. It is cheaper than the ordinary flour-barrel, and it is also adapted for containing moist articles—such as fine-cut chewing-tobacco—which need to be protected from evaporation, or such dry material as chloride of lime (or chloride of calcium) or other deliquescent material, from which the air must be excluded.

What I claim is—

1. A packing-case body composed of two or more sheets of veneer cemented together and having its side seam united by corrodible stitches, said seam and stitches being covered by a coating of non-corrodible cement, substantially as described.

2. A packing-case having a veneer body whose seam is secured by corrodible stitches, said seam and stitches being covered by a coating of non-corrodible cement, for the purpose set forth.

3. The packing-case herein described, consisting of a veneer body, with its wall-seam secured by stitches, and having flanged metallic heads secured to the body by stitches, substantially as described.

4. A packing-case consisting of two or more sheets of veneer cemented together with the grain crossed, the wall-seam being secured by stitches, and of metal flanged heads secured to the body by stitches and by a water-proof material, substantially as described.

5. As a new article of manufacture, a water and acid proof packing-case, consisting essentially of a veneer body with a wall-seam secured by corrodible stitches, the seams and stitches being protected by a covering of non-corrodible cement, and a head secured to the body by stitches, substantially as described.

6. A packing-case consisting of two or more sheets of veneer cemented together, and having a flanged metallic head secured to the body by stitching, substantially as set forth.

In testimony whereof I affix my signature in presence of two witnesses.

RALPH S. JENNINGS.

Witnesses:
W. B. S. GAY,
W. H. MEARS.